United States Patent [19]

Nelson

[11] Patent Number: 5,046,449
[45] Date of Patent: Sep. 10, 1991

[54] VEHICLE SPRAY APPARATUS

[76] Inventor: Riley H. Nelson, 131 E. Highway 50, Winter Garden, Fla. 32787

[21] Appl. No.: 456,504

[22] Filed: Dec. 26, 1989

[51] Int. Cl.[5] .................... B05B 3/02; B05B 12/14
[52] U.S. Cl. .................... 118/315; 118/323; 134/123; 239/150; 239/172; 239/222.11; 239/224; 239/284.1; 239/380; 239/520; 239/522
[58] Field of Search .............. 118/313, 315, 323, 300; 239/77, 171, 172, 222.11, 224, 284.1, 284.2, 380, 382, 383, 500, 520, 522, 147, 150; 134/123

[56] References Cited

U.S. PATENT DOCUMENTS

| | | | |
|---|---|---|---|
| 2,785,013 | 3/1957 | Stearns | 239/224 |
| 2,968,071 | 1/1961 | DiPerna | 239/284.1 |
| 3,067,949 | 12/1962 | Sigvardsson et al. | 239/224 |
| 3,574,337 | 4/1971 | Edwards | 239/284.2 |
| 3,664,585 | 5/1972 | Curtis | 239/224 |
| 4,111,366 | 9/1978 | DeWitte | 239/224 |
| 4,177,928 | 12/1979 | Bergkvist | 239/284.2 |
| 4,832,262 | 5/1989 | Robertson | 239/284.1 |
| 4,905,904 | 3/1990 | Ohara et al. | 239/284.1 |

Primary Examiner—James C. Housel
Attorney, Agent, or Firm—William M. Hobby, III

[57] ABSTRACT

A spray apparatus for coating the front of a vehicle with a liquid to prevent the adherence of insects thereto includes a reservoir for a predetermined liquid material which reservoir is mounted to the vehicle. A pump is coupled to the reservoir for pumping the liquid from the reservoir and a fan is attached to the vehicle grill on the front of the vehicle and has a dispensing tube connected from the pump to the fan for dispensing the material from the reservoir directly into the fan blade for spraying liquid over the front of the vehicle. A second embodiment connects the pump to a plurality of dispensing nozzles, such as a hose attached across the front of a vehicle with a predetermined number of openings or nozzles therein for spraying the liquid over the front of the vehicle. The liquid may also be sprayed through the windshield washer nozzles for spraying liquid from the reservoir onto the windshield.

7 Claims, 2 Drawing Sheets

VEHICLE SPRAY APPARATUS

BACKGROUND OF THE INVENTION

The present invention relates to a vehicle spray apparatus and especially to an apparatus for coating the front of a vehicle with a liquid to prevent the adherence of insects thereto.

In the past it has been common to provide a great many deflectors for placement on different portions of a vehicle for controlling air currents and to prevent windshields from becoming messed up. Such reflectors are placed on the hood for either controlling air currents or deflecting insects to prevent the insects from splattering against the windshield. Screens have also been placed over the front of vehicles to catch insects thereon to prevent the insects splattering on the vehicle and marring the paint. It has also been suggested in the past to coat the front of a vehicle with a vegetable oil so that when insects, such as lovebugs, are splattered on the vehicle, the insects will not stick to the paint and can be readily removed without the paint on the front of the vehicle being damaged. Vegetable oil is not normally suitable for placing on the windshield, however, because it tends to smear the windshield.

In contrast to these prior art techniques for preventing damage to the vehicle paint by insects being hit by the vehicle, the present invention provides a reservoir of a predetermined liquid which is sprayed by a fan spray or by a multi-nozzle sprayer over the front of the vehicle remotely from within the vehicle so that when driving at night or when driving in an area of heavy insect concentration the driver can spray the front of the vehicle and then wash off the coating and insect residue at a later time without having the paint and appearance of the vehicle damaged.

SUMMARY OF THE INVENTION

The present invention relates to a spray apparatus for coating the front a vehicle with a liquid to prevent the adherence of insects to the vehicle and includes a reservoir for a predetermined liquid material mounted to the vehicle. A pump is coupled to the reservoir for pumping liquid therefrom and has a dispensing tube connected from the pump to a fan attached to the vehicle grill on the front of the vehicle. As the pump is operated, it pumps liquid through the dispensing tube from the reservoir into nozzles dispensing the liquid material onto the fan which disperses the material over the front of the vehicle. A second embodiment has a plurality of dispensing nozzles attached across the front of the vehicle to replace the fan dispenser. The spaced nozzles dispense the liquid material across the front of the vehicle. A separate switch may be provided to act on solenoid valves to allow the liquid material in the reservoir to be dispensed through the windshield wiper nozzles directly onto the vehicle windshield for protecting the windshield from damage by insects hitting the windshield. The pump motor and the fan motor are both connected through a switch located inside the vehicle for activating the pump and fan simultaneously from inside the vehicle. A separate switch for activating the pump and solenoid valves is also located inside the vehicle for directing the liquid material onto the vehicle windshield.

BRIEF DESCRIPTION OF THE DRAWINGS

Other objects, features, and advantages of the present invention will be apparent from the written description and the drawings in which.

DESCRIPTION OF THE PREFERRED EMBODIMENTS

Figure 2:
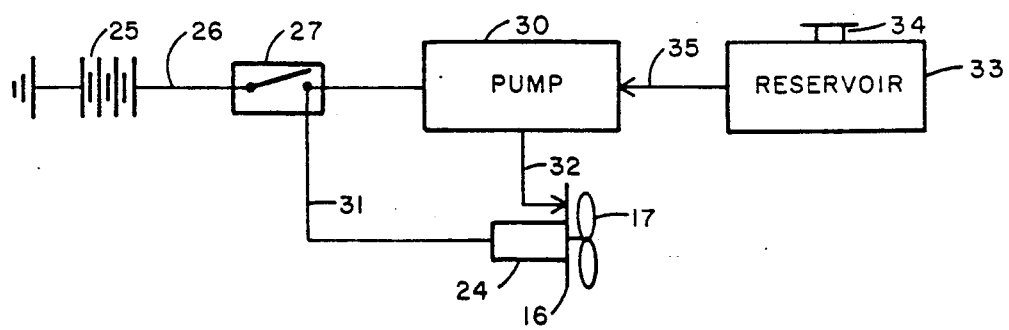
FIG. 2 is a block diagram of a dispensing system in accordance with the present invention.
Figure 1:
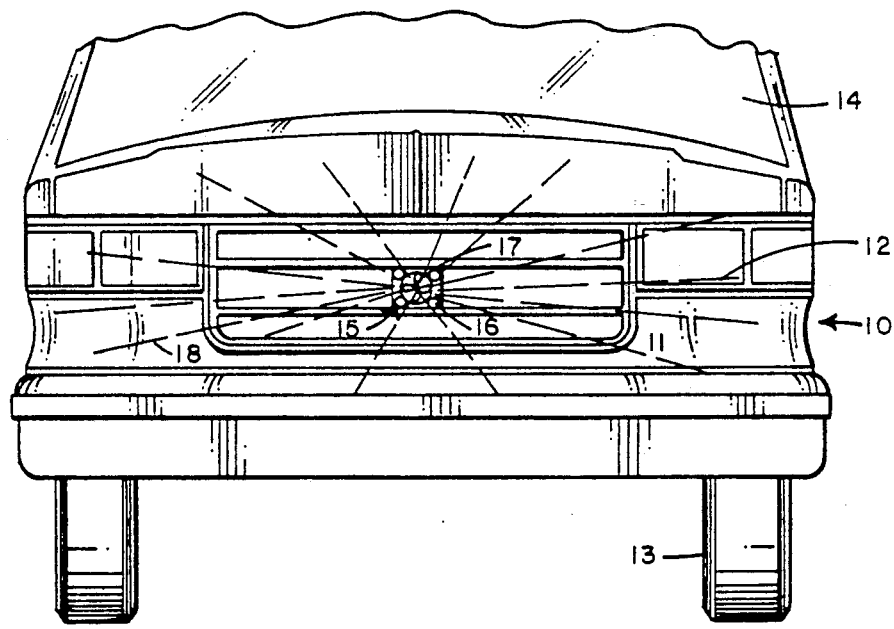
FIG. 1 is a front elevation of a vehicle having a fan dispensing unit mounted in the grill.
Figure 3:
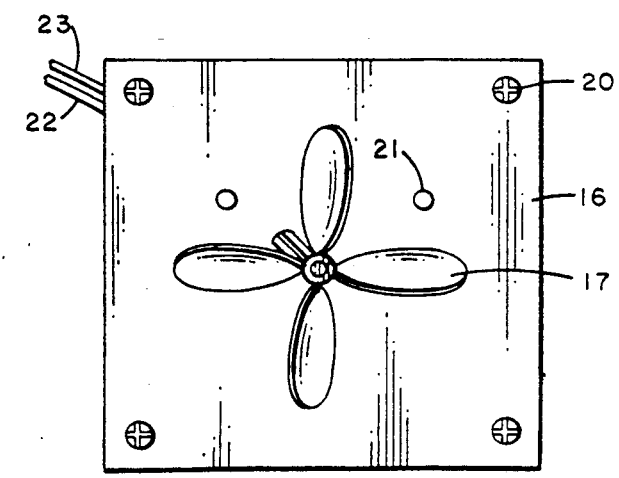
FIG. 3 is a front elevation of the fan dispsenser unit in accordance with FIGS. 1 and 2.

Referring to the drawings and especially to FIGS. 1 through 3, a vehicle 10, such as an automobile, has a grill 11 on the front thereof along with headlights 12, wheels 13, and a windshield 14. A fan dispensing unit 15 is mounted in the grill 11 and has a support plate 16 along with dispensing fan blades 17 dispersing a liquid 18 across the front of a vehicle. In FIG. 3, the mounting plate 16 is illustrated having a plurality of openings 20 therein for holding bolts for attaching the plate to the grill 11 and has the dispensing blade 17 mounted to the front thereof and having an electric fan motor mounted behind the plate 16. The plate 16 has a plurality of nozzle openings 21 therethrough behind the blade 17 for dispersing the liquid directly onto the rotating blade. A hose 22 feeds the liquid to the nozzles 21 while electric conductors 23 feed the power to the motor 24. Thus as seen in FIG. 2, a battery 25 is connected by a conductor 26 through a single pole switch 27 which is then connected through a conductor 28 to a pump 30. Switch 27 is also connected through a conductor 31 to the fan motor 24. The fan motor is connected to the fan support plate 16 having the fan blade 17. A dispensing tube 32 is connected between the pump 30 and the nozzles 21 in the plate 16. A reservoir 33 has a cap 34 for filling the reservoir and is connected by a tube 35 to the pump 30. Pump 27 would normally be located inside the vehicle and can be switched on by the user of the vehicle to connect the battery 25 to actuate the pump 30 and the fan motor 24 simultaneously. This draws the liquid from the reservoir 33 through the pump for dispensing the liquid into the fan blade 17. The preferred liquid to prevent the bugs from sticking to the vehicle includes a mixture of ethylene glycol and castor oil mixed with a surfactant and an aloe vera plant extract gel along with distilled water and a stabilizer and coloring agents. A propylene glycol can be used for the stabilizer.

Figure 4:
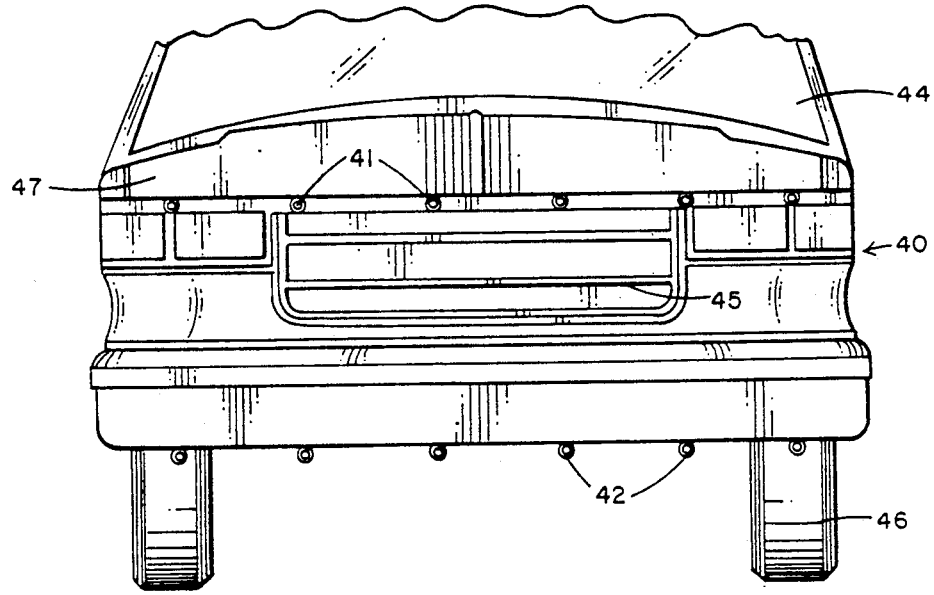
FIG. 4 is a front elevation of a vehicle having a second embodiment of the invention attached thereto.
Figure 5:
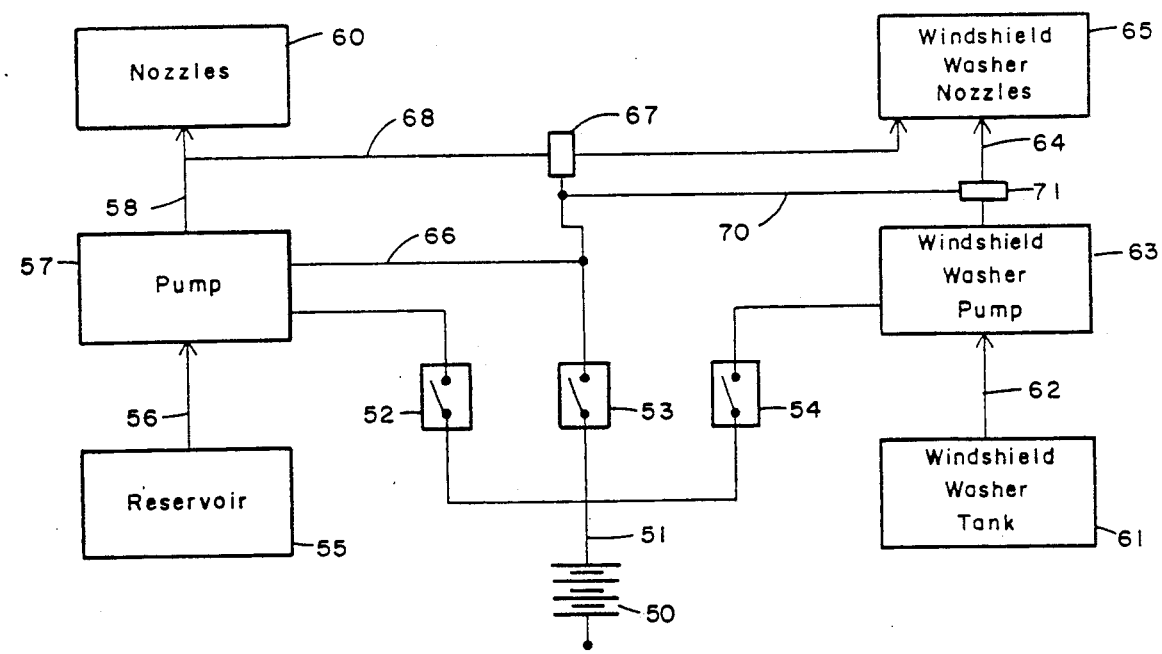
FIG. 5 is a block diagram of a spray apparatus in accordance with FIG. 4.

Referring to FIGS. 4 and 5, a second embodiment of the present invention is illustrated in which a vehicle 40, such as a car, has a plurality of nozzles 41 mounted across the face thereof and a second plurality of nozzles 42 embedded along the bottom of the bumper 43. The vehicle has a windshield 44 along with a grill 45, tires 46, and a hood 47. The nozzles 41 disperse the liquid into the air which covers the hood 47 while the nozzles 42 disperse the liquid over the grill 45 and bumper 43 in front of the vehicle.

In FIG. 5, the battery of the vehicle 50 is connected by a conductor 51 to a plurality of single pole switches 52, 53, and 54. A reservoir 55 is mounted to the vehicle and used to contain a liquid for preventing insects from sticking to the front of a vehicle including a mixture of castor oil, ethylene glycol, aloe vera plant extract, and a surfactant along with distilled water. The reservoir is connected by a pipe 56 to a pump 57 and the pump is connected by a tube 58 to a plurality of nozzles 60. The switch 52 activates the pump 57 to disperse the liquid from the reservoir 55 through the nozzles 60. The vehicle also has a windshield washer tank 61 which is connected by a tube 62 to a windshield washer pump 63 which in turn is connected through a tube 64 to the windshield washer nozzle 65. Activation of the switch 54 activates the windshield washer pump 63 to disperse the windshield washer fluid from the tank 61 through the nozzle 65. The third switch 53 is connected through a conductor 66 to the pump 57 for activating the pump to disperse liquid from the reservoir 55 through the nozzle 60. Simultaneously, the switch 53 activates a solenoid valve 67 which opens a fluid line 68 from the fluid line 58 to the windshield washer nozzle 65. The conductor 70 simultaneously activates a second solenoid valve 71 within the windshield washer line 64. The solenoid valve 71 is a normally open valve which is closed by the application of a voltage to the valve by the turning on of switch 53. The solenoid valve 67 on the other hand is a normally closed valve which is open by the switching of the switch 53 to apply voltage to the solenoid valve 67. Thus, the line 68 is open while the line 64 is closed by the switch 53 which simultaneously activates the pump 57 to dispense liquid through the nozzle 60 and through the windshield washer nozzle 65 to coat the front of the vehicle as well as the front of the windshield of the vehicle. Once the vehicle front is coated with the liquid, bugs hitting the front of the vehicle will still be splattered onto the front of the vehicle but will not stick thereto and any remains can be washed off at a later time. In addition, the liquid prevents the corrosive elements in the smashed insects from damaging the paint of the vehicle.

It should be clear at this time that a spray apparatus for coating the front of a vehicle with a liquid to prevent the adherence of insects thereto has been provided. However, the present invention is not to be limited to the forms shown which are considered to be illustrative rather than restrictive.

I claim:

1. A spray apparatus attached to a vehicle for coating a front end of the vehicle with a liquid to prevent the adherence of insects thereto comprising:
   a vehicle having a front end and a rear end; and a battery;
   a reservoir for a liquid material, said reservoir being mounted to the vehicle for coating the front of the vehicle;
   a pump coupled to said reservoir for pumping liquid therefrom;
   a fan located on the front end of the vehicle; and
   a dispensing tube connected to said pump at one end and having the other end thereof mounted adjacent said fan for dispensing pumped liquid into said fan whereby liquid pumped from said reservoir is sprayed onto the front end of the vehicle by said fan.

2. A spray apparatus for coating the front of a vehicle with a liquid to prevent the adherence of insects thereto in accordance with claim 1 in which said pump is connected to the vehicle battery through a switch located in said vehicle whereby said pump can be turned on and off from inside said vehicle.

3. A spray apparatus for coating the front of a vehicle with a liquid to prevent the adherence of insects thereto in accordance with claim 2 in which said fan has an electric motor connected to the vehicle battery through said pump switch located in said vehicle whereby said fan is turned on and off from inside said vehicle with said pump.

4. A spray apparatus for coating the front of a vehicle a liquid to prevent the adherence of insects thereto in accordance with claim 3 in which said fan is attached to a grill on the front end of said vehicle.

5. A spray apparatus for coating a front end of a vehicle with a liquid to prevent the adherence of insects thereto comprising:
   a vehicle having a battery, a windshield, a front end extending forwardly of said windshield, and windshield washing means for spraying windshield washer fluid upon said windshield, said windshield washer means having a tank and a plurality of windshield washer nozzles aimed at the windshield and coupled to the tank through a tube;
   a reservoir for a liquid material mounted to a vehicle for coating the front end of the vehicle;
   a pump coupled to said reservoir for pumping liquid therefrom;
   a plurality of dispensing nozzles attached to the front end of the vehicle, said dispensing nozzles being spaced a predetermined distance from each other across the front end of the vehicle; and
   dispensing tube means connected to said pump and to each dispensing nozzle for dispensing pumped liquid from said plurality of dispensing nozzles onto the front end of the vehicle whereby liquid pumped from said reservoir is sprayed onto the front end of the vehicle by said dispensing nozzles, said dispensing tube means also being connected to the tube coupled to said windshield washer nozzles with a solenoid valve having a switch connected thereto for switching said windshield washer nozzles from the windshield washer tank to said reservoir.

6. A spray apparatus for coating the front of a vehicle with a liquid to prevent the adherence of insects thereto in accordance with claim 5 in which said plurality of dispensing nozzles are located in one dispenser tube mounted across the front end of said vehicle.

7. A spray apparatus for coating the front of a vehicle with a liquid to prevent the adherence of insects thereto in accordance with claim 6 in which said pump is connected to the vehicle battery through a switch located in said vehicle whereby said pump can be turned on and off from inside said vehicle.

* * * * *